July 22, 1941.　　　H. W. ROBINSON　　　2,250,082
FLUID DRIVE
Filed Jan. 28, 1941　　　2 Sheets-Sheet 2
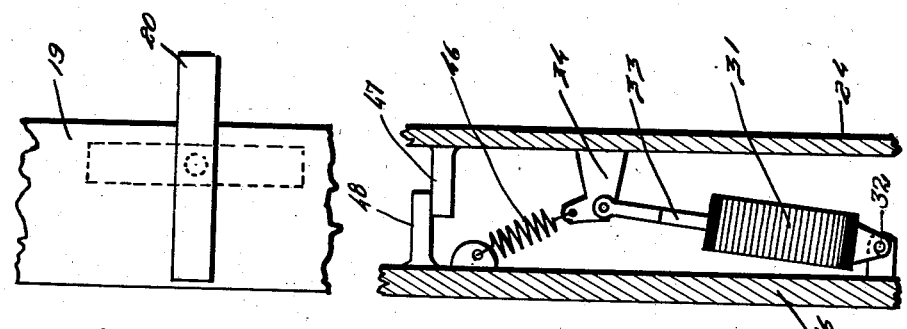
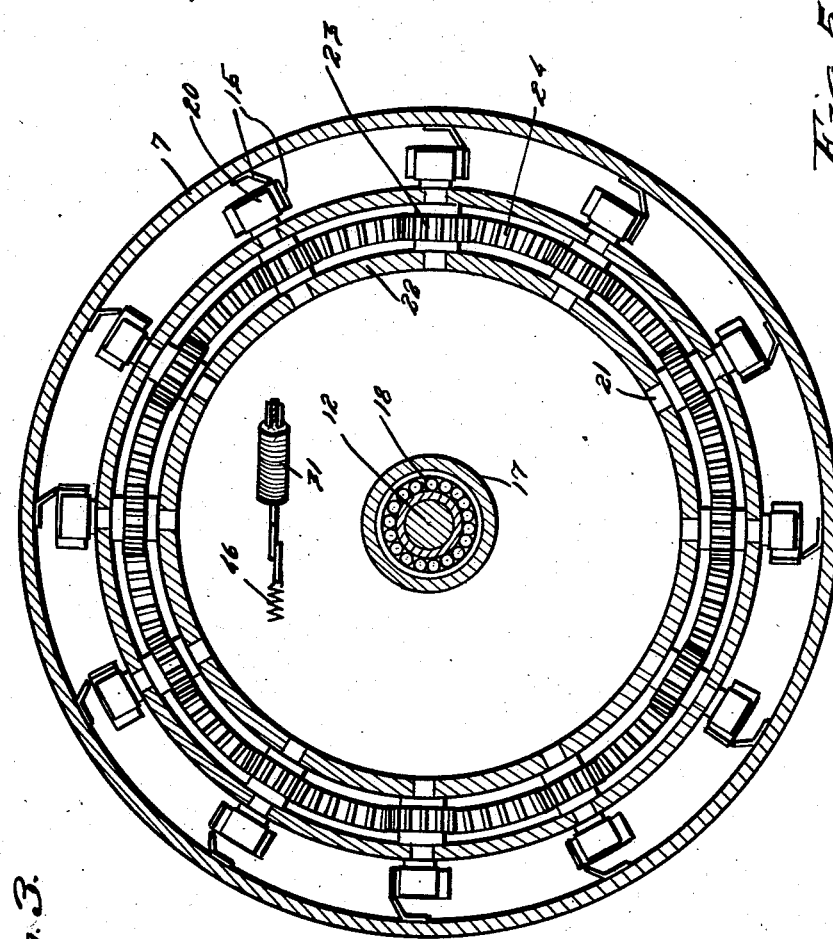
Inventor
Harry W. Robinson
By Clarence A. O'Brien
Attorney Patented July 22, 1941

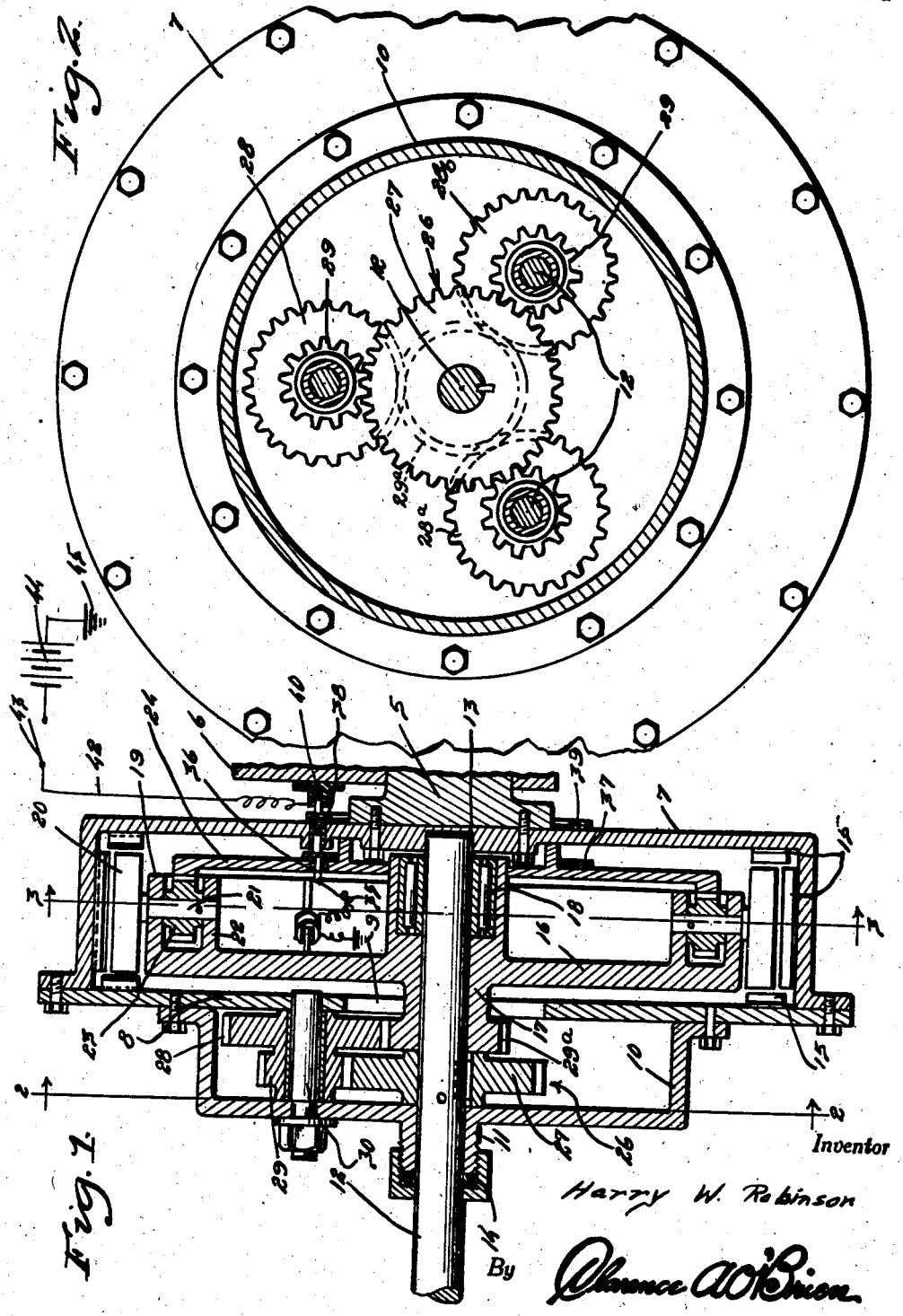

2,250,082

UNITED STATES PATENT OFFICE 2,250,082

FLUID DRIVE

Harry W. Robinson, Sharpsville, Pa.

Application January 28, 1941, Serial No. 376,374

2 Claims. (Cl. 74—293)

This invention relates to a fluid drive, and has for the primary object the provision of a device of this character which will replace a clutch and a variable speed gear transmission between a power shaft and a load or driven shaft and will provide variable speed ratios between said shafts ranging from non-drive of the load shaft by the drive shaft to substantially the same number of revolutions to the load shaft as the number of revolutions of the drive shaft, so as to provide a direct drive between the drive and load shafts without the engaging or disengaging of gears or the use of mechanical clutch units or elements and will have approximately a four to one gear reduction between the driven plate or disc of the device and the load shaft when the power source is acting to start the load from a standstill.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a vertical sectional view illustrating a fluid drive constructed in accordance with my invention.

Figure 2 is a transverse sectional view taken on the line 2—2 of Figure 1.

Figure 3 is a transverse sectional view taken on the line 3—3 of Figure 1.

Figure 4 is a fragmentary plan view illustrating one of the blades of the driven plate or disc of the device, and showing the different positions the blade may occupy.

Figure 5 is a fragmentary sectional view showing the electrical means employed for adjusting the blade shown in Figure 4 to its different positions.

Referring in detail to the drawings, the numeral 5 indicates a drive shaft which may form a part of a power source such as an internal combustion engine, electric motor or the like, a fragmentary portion of which is indicated by the character 6. Bolted on the end of the drive shaft 5 is a housing 7 adapted to contain a liquid and has a removable rear wall 8 provided with an opening 9 in axial alignment with the drive shaft 5. An auxiliary gear housing 10 is removably mounted on the rear wall of the housing 7 and is provided with a bearing 11 also arranged in axial alignment with the drive shaft 5 and rotatably supports a load or driven shaft 12, the forward end of which is piloted in a bearing opening 13 formed in the front plate or wall of the housing and which also is arranged in axial alignment with the drive shaft 5. The bearing 11 includes a packing gland 14 to prevent the liquid from escaping from the housings 7 and 10 about the load or driven shaft.

The front and rear walls as well as the peripheral wall of the housing 7 have formed thereon blades 15. The blades 15 are arranged in three groups with the blades of each group in annular relation to each other. One group of the blades is formed on the front wall of the housing 7 while a second group is formed on the rear wall of the housing directly opposite the group of blades on the front wall, while the third group of blades is formed on the peripheral wall of the housing.

A driven plate or disc 16 is journaled on the load or driven shaft 12 within the housing 7, the hub of which is indicated by the character 17 and extends through the opening 9 into the gear housing 10. The hub 17 is of such a construction that it will receive roller bearings 18 for the support of the driven disc or plate on the load or driven shaft.

A peripheral flange 19 is formed on the plate or disc 16 and extends at right angles thereto and rotatably supports a plurality of blades 20 which may be positioned to either parallel the group of blades on the peripheral wall of the housing 7 or to extend at right angles thereto. The blades 20 include shafts 21 journaled in the peripheral flange 19 and an inner flange 22 formed on the disc or plate 16. Gears 23 are secured on the shafts 21 and mesh with a ring gear 24 journaled on the hub of the plate or disc 16. A means is provided for rotating the ring gear 24 in opposite directions for changing the positions of the blades 20 with respect to the blade on the housing 7.

When the blades 20 are positioned to parallel the blades on the periphery of the housing 7, the passage of liquid between the blades is substantially blocked off to an extent that when the housing 7 or the power shaft reaches a certain number of revolutions per minute the disc or plate 16 will rotate approximately the same number of revolutions and in the same direction.

A planetary gearing arrangement indicated in entirety by the character 26 connects the plate or disc 16 to the load or driven shaft 12 and is located within the gear housing 10. The planetary gearing arrangement includes a sun gear 27 and gears 28, 28a and 28b and a plurality of cluster gears 29 journaled on shafts 30 carried by the housings 10 and 7. A gear 29a is provided on the hub 17 and meshes with gears 28, 28a and 28b. The gear 27 meshes with the smaller gears of the cluster gears 29. The planetary gearing arrangement 26 will provide between the disc or plate 16 and the load or driven shaft 12 approximately a four to one gear ratio which will act when the disc or plate 16 starts its rotation from a non-rotating position by the housing 7, consequently permitting the power source to take up the load easily and smoothly. However, as the number of revolutions of the disc or plate 16 increases by the increased rotation of the housing 7 the gear reduction between the plate or disc 16 and the load or driven shaft 12 stops due to the arrangement of the planetary gearing. A substantially direct drive between the housing 7 and the load or driven shaft will be had when the disc 16 is rotating in the same direction as the housing 7 and at approximately the same number of revolutions per minute.

A solenoid 31 is pivotally mounted on the plate or disc 16, as shown at 32, and the core 33 thereof is pivotally mounted to a bracket 34 secured on the ring gear 24. The solenoid is electrically connected to a ground of an electric circuit, as shown in Figure 1, and also has an electric conductor 35 connected thereto which in turn connects to a terminal 36 carried by and insulated from the ring gear and which is connected to a collector ring 37 mounted on and insulated from the ring gear. A spring influenced brush 38 is mounted on and insulated from the housing 7 and contacts the collector ring 37 and also a collector ring 39 mounted on and insulated from the housing 7.

A brush 40 is mounted on the fixed portion of the motor or power source and insulated therefrom and has connected thereto a conductor 42 connected to a switch 43 located in convenient reach of the operator. The switch 43 is electrically connected to a battery or other electrical source 44 connected to the ground, as shown at 45. When the switch 43 is in a closed position the solenoid will be energized imparting rotation to the ring gear 24 to position the blades 20 at right angles to the group of blades on the peripheral wall of the housing 7 so as to permit a free flow of fluid between the blades of the device so that the load or power shaft will remain idle regardless of the speed of rotation of the power shaft 5.

To return the ring gear 24 to a position of placing the blades 20 in parallelism with the group of blades on the peripheral wall of the housing 7, a coil spring 46 is connected to the ring gear and to the bracket 34 and acts on the immediate deenergization of the solenoid.

Stops 47 and 48 are formed on the housing 7 and the ring gear for the purpose of limiting the movement of the ring gear beyond a position of paralleling the blades 20 with the group of blades on the peripheral wall of the housing 7 when the spring acts at the time of the deenergization of the solenoid.

The electrical control for the ring gear need only be employed should the speed of the power shaft be at a high number of revolutions as well as the load shaft when it is desired to declutch the power shaft from the load shaft as in the case of stopping an automobile when traveling at a high rate of speed under the power of the engine and it is not desired to slow down the speed of the engine through the use of the brakes of the vehicle.

When the housing 7 is rotating at idling speed of the engine, the disc 16 will rotate in an opposite direction to the direction of rotation of said housing 7 and as the blades 20 are positioned to check the passing of the fluid, the rotation of the disc 16 is decreased and brought to a stop and at this time the load or driven shaft starts to rotate at a much decreased rate of speed over the speed of rotation of the drive shaft or housing. This reduction of speed of the load shaft is provided by the planetary gearing 26 and as the speed of the drive shaft increases the speed of the load shaft gradually increases until the disc 16 rotates at approximately the same rate of speed as the speed of rotation of the housing 7 which at this time provides direct drive between the drive shaft and the load or driven shaft.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a fluid drive, a fluid housing secured to and driven by a power source, blades mounted on walls of the housing and arranged in annular groups, a load shaft journaled in the housing, a driven disc journaled on the shaft within the housing, blades coacting with the first-named blades and fluid in the housing and rotatably mounted on the disc to establish a variable speed drive between the housing and the disc and for interrupting the drive between said housing and disc, a gear reduction drive means connecting the disc to the load shaft, gears secured to the second-named blades, a ring gear rotatably mounted in the housing and meshing with said gears, coactive stops on the ring gear and the disc for limiting the rotation of the ring gear in one direction, a spring acting on the ring gear to bring the stops into engagement with each other, and electrical means connected to the ring gear and the disc for rotating the ring gear in a reverse direction from the spring.

2. In a fluid drive, a fluid housing secured to and driven by a power source, blades mounted on walls of the housing and arranged in annular groups, a load shaft journaled in the housing, a driven disc journaled on the shaft within the housing, blades coacting with the first-named blades and fluid in the housing and rotatably mounted on the disc to establish a variable speed drive between the housing and the disc and for interrupting the drive between said housing and disc, a gear reduction drive means connecting the disc to the load shaft, gears secured to the second-named blades, a ring gear rotatably mounted in the housing and meshing with said gears, coactive stops on the ring gear and the disc for limiting the rotation of the ring gear in one direction, and force applying means on the ring gear adapted to bring the stops into engagement with each other.

HARRY W. ROBINSON.